March 9, 1965  A. M. WRIGHT  3,172,254
PROPELLANT CONTROL SYSTEM FOR A ROCKET ENGINE
Filed April 17, 1961  2 Sheets-Sheet 2

INVENTOR
A. M. WRIGHT
BY
ATTORNEYS

3,172,254
PROPELLANT CONTROL SYSTEM FOR A ROCKET ENGINE
Alexander M. Wright, West Hartford, Conn., assignor to Chandler Evans Corporation, West Hartford, Conn., a corporation of Delaware
Filed Apr. 17, 1961, Ser. No. 103,330
11 Claims. (Cl. 60—35.6)

This invention pertains to propellant control systems for rocket engines, and more particularly has reference to such systems having means for insuring a *constant* preselected *ratio* between the rate of fuel flow and the rate of oxidizer flow, notwithstanding variations in system operating conditions.

In the design of a monopropellant or bipropellant control system, as may be used (for example) in a satellite attitude control system, it is important, in the interest of providing low fuel consumption rate, to assure that the output thrust from any given chamber-gas nozzle assembly is *invarient* during the operating life of the system.

It is also important to assure that a *pre-selected ratio* of *oxidizer* to *fuel flow* is delivered to each combustion chamber despite changes in system conditions, such as: variations in propellant tank pressure, changes in the geometry or sizes of the injectors or chamber-gas nozzles, or changes in system environmental conditions. The importance of being able to provide one particular value of mixture ratio may lie in either *one* or more of the following considerations:

(a) Assuring that the *maximum* specific impulse mixture ratio is provided during the complete life of the system, thereby resulting in the minimum weight of propellants for a given mission.

(b) Assuring that the mixture ratio is such that chemical composition of the gas products will not cause oxidation reactions with the chamber-nozzle assembly where such recations are possible.

(c) Assuring that the two propellants, in the case of a bipropellant system, are exhausted *simultaneously* providing for *efficient* propellant utilization.

In a thrust rocket type of attitude control system for a satellite, it is necessary to shut down and start up the small rockets, and hence, the use of liquid fuel is almost mandatory, usually using "hypergolic" mixture of fuel and oxidizer. The fuel and oxidizer tanks in such a system are pressurized by means of high pressure gas.

It is usual, in large rockets such as those used for missile propulsion, to meter the liquid fuel and oxidizer through injection orifices at the entry to the combustion chamber, the metering pressure being the pressure of the tank fuel, or in some cases a high pressure generated by a pump.

In the case of an attitude and orbital control of a satellite, the thrust of the control rockets is very small, perhaps less than ½ pound, and where the high pressure existing in the fuel and oxidizer tanks is used to meter the fuel to the combustion chamber, the injection metering orifices are exceedingly small, resulting in difficulty of manufacture, and with the intolerable hazard that these small orifices are susceptible to clogging from minute particles of impurities in the system.

But on the other hand, if the injection orifices are large enough to avoid these hazards, the pressure drop across the flow orifices must be quite low because of the small fluid flow through them. I have found, however, that satisfactory ignition can be obtained, even with very low injection pressures, and the problem is to meter the correct amounts of fuel and oxidizer through relatively large injection nozzles when the available pressure (i.e. the tank pressure) is high.

My invention achieves this desirable result by the use of separate constant flow devices which are independent of the system pressure level. My invention has the further desirable effects that the flow to the combustion chambers is not affected by clogging or other changes in the injection nozzles, and in addition, as will be shown below, the thrust generated by the rockets is independent of rocket nozzle erosion.

The thrust of a fluid jet (choked) nozzle can be written as:

$$F = C_f P_c A_t \qquad \text{(Eq. 1)}$$

where:
$F$ = thrust
$C_f$ = thrust coefficient
$P_c$ = chamber pressure
$A_t$ = nozzle throat area The flow rate through the choked nozzle throat is:

$$\frac{wT_c}{P_c A_t} = K \qquad \text{(Eq. 2)}$$

where:
$w$ = total propellant or gas flow rate
$T_c$ = chamber temperature, a constant for any given propellant(s)
$K$ = a constant for any given gas product mixture for the conditions of choked flow.

Solving for the chamber pressure ($P_c$) in Eq. 2 and substituting into Eq. 1 results in:

$$F = C_f \frac{wT_c}{K} \qquad \text{(Eq. 3)}$$

On the reasonable assumption that the thrust coefficient is constant, it can be seen from Eq. 3 that a system which features a device that keeps the flow rate ($w$) constant will assure constant output thrust (F), since the reaction temperature $T_c$ is constant for any given combination of propellants.

Present practice in the control of rocket engines is to meter the flow of propellants through *fixed* orifice elements, while keeping the pressure drop between the propellant tanks and combustion chamber a constant.

This scheme is generally satisfactory in applications where the engine operating time is of short duration since such operation either doesn't result in significant changes in the preset values of engine design parameters (propellant pressure, injector or thrust nozzle orifice dimensions, etc.) or where the net effects of any change in engine performance, as a result of such actions, is simply anticipated, accepted and possibly compensated for by some other means.

However, in an application involving the use of such engines for an extended period of time, perhaps for years, and where the engine output thrust value is low (as in a satellite attitude control or vernier system), the likelihood of experiencing the aforementioned variations in design parameters is increased because of the effects of long cumulative operating time and the sensitivity of such low thrust hardware to these variations is generally greater. As is shown hereinbelow, in connection with the effects of variations in propellant tank pressure and gas nozzle throat erosion upon output thrust, progressive increases in output thrust of any one nozzle during the life of the system result in increased fuel consumption during limit cycle operation, with a corresponding possible reduction in the accuracy with which the satellite attitude is held, and a possible deterioration in the reproducibility of pulses from any one chamber, or between corresponding chambers. A permissible tolerance on output thrust is usually specified in such systems, therefore, one of the principal features of this invention is to provide a system which uses constant flow rate regulators and is thereby better able to provide a constant value of output thrust, despite the aforementioned variations in engine parameters.

In the case of systems which are to provide a low value of output thrust, the physical size of the propellant flow passages becomes very small and may be dirt sensitive. Therefore, the use of flow regulators, according to my invention, are of further benefit to the reliability of the system, since if any element downstream of the flow regulators should clog with dirt, etc., the action of the flow regulator will be such as to open its variable area orifice, thereby applying full propellant supply pressure tending to wash away the dirt and restore the system to its original unclogged condition.

The principal objects of my invention are as follows:

To provide a propellant control system (for a rocket engine) wherein the rate of fuel flow and the rate of oxidizer flow to the combustion chamber is maintained at a preselected *constant* ratio, despite changes in system operating conditions, such as: variations in propellant tank pressure; changes in the geometry or sizes of the propellant fluid injectors, and/or combustion chamber discharge nozzle; and changes in system environmental conditions; thereby obtaining the minimum weight of propellants for a given mission.

To provide such a system, wherein said *constant* ratio is maintained throughout the complete life of the system, notwithstanding changes in the area of the discharge nozzle, due to erosion of the walls of said nozzle, caused by oxidation reaction between the material of said walls and the fluids passing through said nozzle.

To provide such a system having flow regulators for regulating the flow of the propellant and oxidizing fluids, wherein if any element downstream of said flow regulators should clog with dirt, or other extraneous material, the action of each flow regulator will be such as to open its variable area orifice, thereby applying full propellant and/or oxidizer supply pressure, so as to wash away said dirt or extraneous material and restore the system to its original unclogged condition.

To provide such a system where, in the case that a plurality of propellant fluids are employed, said fluids are exhausted simultaneously, so as to obtain efficient propellant utilization.

With these and other objects in view that may be incident to my improvements, my invention consists in the combination and arrangement of elements hereinafter described and illustrated in the accompanying drawings, in which.

Figure 1:
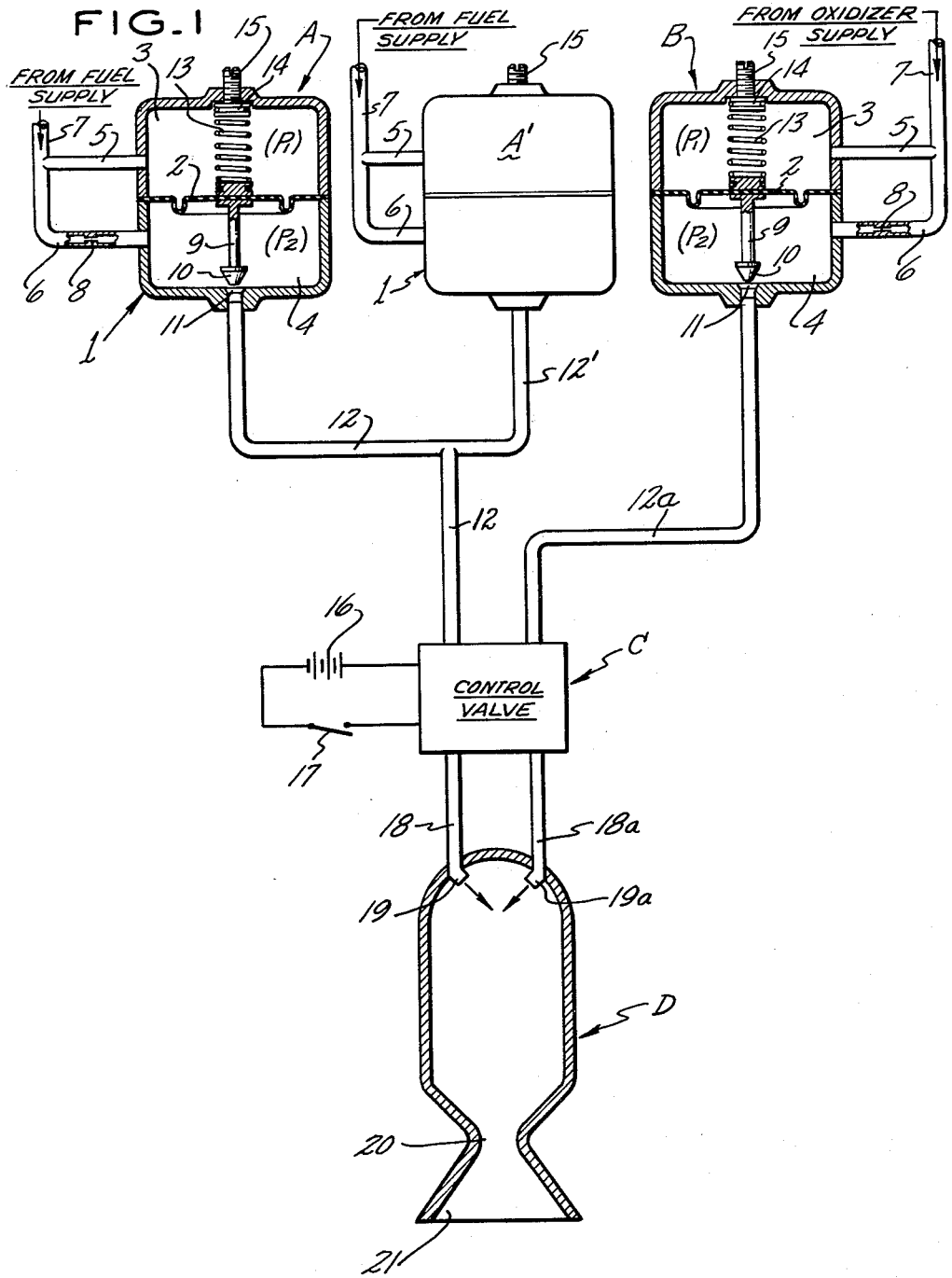
FIGURE 1 shows schematically a rocket engine propellant control system, in accordance with my invention.

Referring to FIGURE 1, it will be noted that my improved propellant control system broadly comprises the following principal elements: a constant flow rate regulator A for regulating the rate of propellant fuel from a fuel supply source (not shown) to a combustion chamber D; a constant flow rate regulator B, for regulating the rate of oxidizer flow from an oxidizer supply source (not shown) to combustion chamber D; and a control valve C, for simultaneously controlling the flows of fuel (from regulator A) and oxidizer (from regulator B) to the combustion chamber D.

Fuel flow regulator A comprises a housing 1, which is divided by a flexible diaphragm 2 into two equal chambers 3 and 4, that are respectively connected by conduits 5 and 6 to conduit 7 communicating with a source of propellant fluid (not shown). In conduit 6 is a fixed area metering restriction 8 through which fluid flowing from conduit 6 into chamber 4 sustains a drop in pressure proportional to the square of its rate of flow. Attached to the center of diaphragm 2 is a valve 9 having a contoured head 10, which varies the flow area of an orifice 11 at the upper end of a conduit 12, through which propellant fluid flows from chamber 4 to combustion chamber D, via control valve C.

Owing to restriction 8, the pressure ($P_1$) in chamber 3 is higher than the pressure ($P_2$) in chamber 4, and the pressure differential ($P_1-P_2$) acts downwardly on diaphragm 2, so as to reduce the flow area through orifice 11. A tension spring 13 is interposed between the upper face of diaphragm 2 and an abutment 14, which is adjustably attached to the upper wall of housing 1 by means of a screw-threaded shank 15, whereby the tension on spring 13 may be varied as desired.

From the foregoing, it is apparent that constant flow regulator (A) comprises a fixed area orifice 8 and a variable area orifice 11 in series in the feed lines 7 and 12 to the combustion chamber D, a pressure sensing diaphragm 2 and provisions for an adjustable force spring 13, acting upon this diaphragm.

This assemblage is a feedback device which is capable of detecting the pressure drop ($P_1-P_2$) across the calibrated fixed area orifice 8, and the flow rate therethrough. This measured signal is compared with a preselected desired flow rate (by the adjustable force of spring 13) with the result that the area presented at the variable orifice 11 continuously adjusts itself to whatever value is required to deliver the preset value of flow through conduit 12. A bipropellant system would employ two such regulators as is shown at A and at $A^1$ in FIGURE 1, and the flow from the second propellant flow regulator would be discharged through a conduit 12' into the combustion chamber B.

The construction and arrangement of the oxidizer fluid flow regulator B is identical with propellant fluid flow regulator A, and hence, no further detail description of the former is necessary. Constant flow regulators constructed in accordance with FIGURE 1 have been tested and have demonstrated their ability to accurately control flow rates over a wide range of pressure drops ($P_1-P_2$) and for a wide range of inlet pressure ($P_1$) levels.

Control valve C is a conventional solenoid-operated on-and-off valve which, when energized by the flow of electric current from a battery 16 to the solenoid in valve C (upon closing switch 17), opens flow communication between inlet conduit 12 and 12a and an outlet conduit 18, which terminates in an injector 19, and also simultaneously opens flow communication between conduit 12a and an outlet conduit 18a which terminates in an injector 19a; whereby fluids are introduced into combustion chamber D. Conversely, when switch 17 is opened, the solenoid in valve C is deenergized and valve C cuts off all flow from conduits 12 and 12a to conduits 18 and 18a.

The combustion gases in chamber D are discharged as a propulsion jet through a nozzle throat 20 and an expansion nozzle 21 at the lower end of chamber D.

Figure 2:
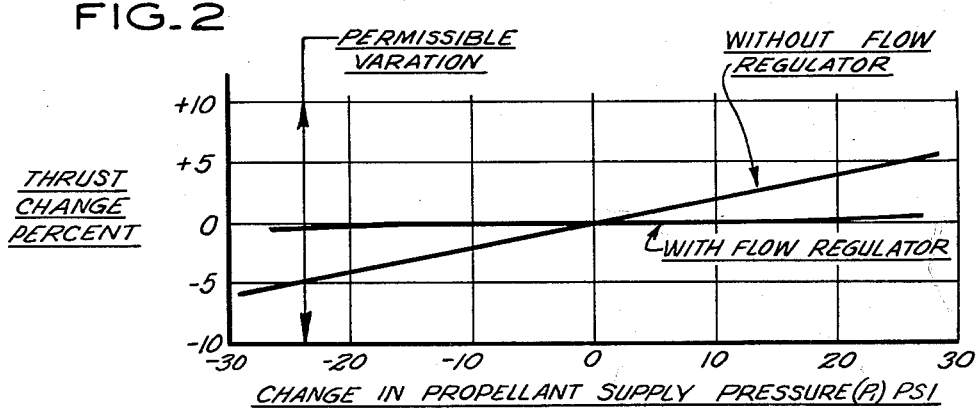
FIGURE 2 is a diagram showing the effect of propellant tank pressure variation on the jet thrust of the engine.

In FIGURE 2, I have shown the variation of engine thrust that accompanies a change in propellant supply pressure ($P_1$), both with and without the use of my constant flow regulators A and B. Thus, when these regulators are not used, a variation of plus or minus 5 percent in engine thrust occurs with a variation of plus or minus 30 percent change in propellant supply pressure ($P_1$) and vice versa; but, when said regulators are used, a similar variation in pressure ($P_1$) produces substantially no (zero) variation in engine thrust.

Figure 3:
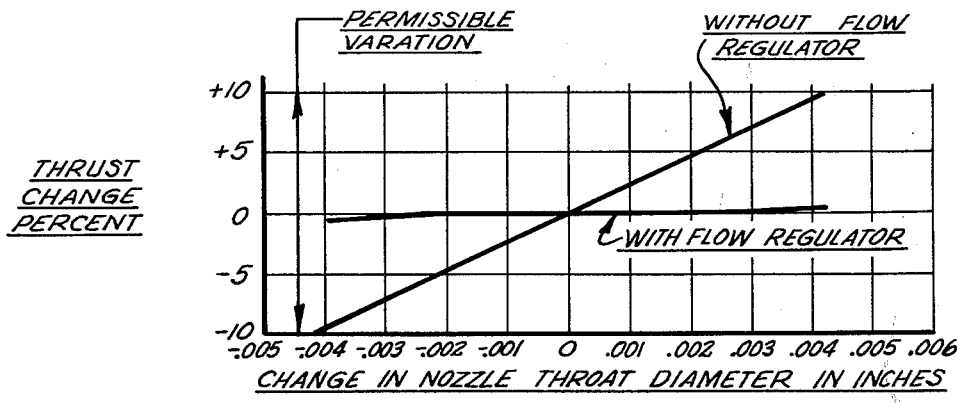
FIGURE 3 is a diagram showing the effects of jet nozzle area expansion (due to erosion) on the jet thrust of the engine.

FIGURE 3 shows the effect on engine thrust of variation in nozzle flow area, both with and without the use of my constant flow regulators A and B. Thus, when these regulators are not used, an increase of .0042" in the diameter of the nozzle throat 20 (due to erosion) produces an increase of 10 percent in engine thrust; and conversely, the same decrease in said diameter (due to accumulation of oxidation products) produces the same decrease in engine thrust; but when said regulators are used, similar variations in nozzle throat diameter produce substantially no (zero) variations in engine thrust.

Figure 4:
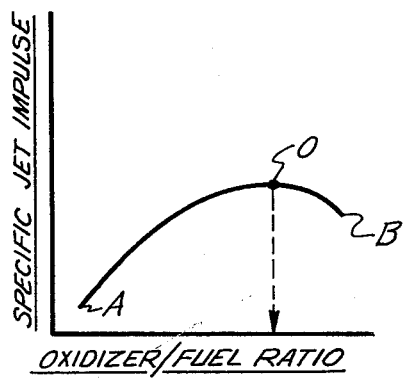
FIGURE 4 is a diagram showing the general relation of the oxidizer/fuel flow ratio to the specific jet impulse of the engine.

In FIGURE 4, the curved line AOB shows the variable relation between the oxidizer/fuel flow ratio and the specific jet impulse produced by said ratio. It will be noted from curve AOB that, as the oxidizer/fuel flow ratio is increased, the specific jet impulse increases at a decreasing rate, until a maximum value of specific jet impulse is reached at some point (O), as indicated by the dotted vertical line in FIGURE 4. By suitably adjusting the tension of springs 13, by means of screws 15 (in regulators A and B), the ratio of the flows of propellant and oxidizer fluids can be regulated to give the maximum value of specific jet impulse, as indicated by the point O in FIGURE 4; and since said regulators maintain these flows at said constant ratio, despite changes in system operating conditions, the engine performs any given mission with the *minimum* weight of oxidizer and propellant.

In a bipropellant rocket engine system, the ratio of propellant flow to oxidizer flow, can be similarly maintained at preselected constant value to give maximum specific jet impulse by suitably adjusting the screws 15 of propellant regulators (A) and (A') and the oxidizer regulator (B). Where the maximum specific jet impulse is less important than prevention of erosion in the nozzle throat (20), the preselected ratio between the flows of propellant and oxidizer can be chosen so that no oxidation reactions occur in the walls of the combustion chamber (D) and nozzle (20) assembly.

Where the physical sizes of the propellant and oxidizer flow passages are very small (as in a satellite attitude control or vernier system), said passages are very dirt sensitive, and an accumulation of dirt in any of these passages reduces the accuracy with which the satellite altitude is held. The use of my improved flow regulators (A and B) provides a unique solution for this troublesome problem since, if any element downstream of the flow regulators should clog with dirt, the action of the flow regulator will be to automatically open its variable area orifice (11), thereby applying full propellant (and/or oxidizer) supply pressure to wash away the dirt and restore the system to its original unclogged condition.

While I have disclosed the preferred embodiment of my invention, I desire it to be understood that I do not limit it to the details of construction shown by way of illustration, as these may be changed and modified by those skilled in the art without departing from the spirit of my invention or exceeding the scope of the appended claims.

I claim:

1. A propellant control system for a rocket engine comprising: a source of fluid propellant under pressure, and a source of fluid oxidizer under pressure, each source connected by a fluid feed conduit to a common propellant combustion chamber; and a constant rate flow regulator in each feed conduit, for maintaining the fluid flow therethrough at a constant preselected rate, despite changes in system operating and environmental conditions; first means for adjusting each of said preselected rates so as to obtain a preselected constant ratio therebetween, each said regulator having a fixed area metering restriction, arranged in upstream flow series with a variable area restriction; and second means for automatically varying the area of said variable restriction in accordance with the fluid pressure drop across its corresponding fixed restriction; whereby the fluid flow through each said conduit is maintained at a preselected constant rate, with consequent constant mixture ratio of said fluids, despite changes in system operating and environmental conditions.

2. A propellant control system according to claim 1, which includes a unitary, manually operated and electric solenoid actuated control valve, interposed in both feed conduits between the flow regulator in each conduit and said combustion chamber, so that the flow through both said conduits may be simultaneously cut-off by manual operation of said valve.

3. A propellant control system according to claim 1, wherein each said second means comprises a contoured valve, and a movable element, responsive to the pressure drop across its corresponding fixed restriction, for so positioning said valve with reference to said variable restriction, as to maintain a constant rate of fluid flow therethrough, despite changes in system operating and environmental conditions.

4. A propellant control system according to claim 3, wherein each said valve and element are arranged to maintain a constant rate of flow therethrough, and consequent constant propellant/oxidizer mixture ratio, notwithstanding relatively large changes in propellant and oxidizer source pressure; so that the thrust produced by the discharge of combustion gases from said combustion chamber is maintained substantially constant, despite said relatively large source pressure changes.

5. A propellant control system according to claim 3, wherein each said valve and element are so arranged that any clogging of a conduit downstream of its valve by accumulation therein of dirt and other extraneous material, will cause said valve to open its variable restriction, thereby increasing fluid flow through said conduit, so as to sweep out said dirt and material and restore said conduit to its normal flow area.

6. A propellant control system according to claim 3, wherein each said regulator includes a spring, and each said element comprises a flexible diaphragm, which moves said valve towards its closed position, in opposition to the tension of said spring 7. A propellant control system according to claim 6, wherein the first means in each said flow regulator comprises means for manually adjusting the tension of each said spring, so as to obtain a constant, preselected rate of fluid flow through each regulator; each said spring tension adjusting means being adapted to so regulate the rates of propellant and oxidizer flows as to produce a constant, preselected mixture ratio between said flows, such that the gas products of combustion of said propellant and oxidizer do not cause oxidation reactions with said combustion chamber.

8. A propellant control system according to claim 7, wherein said combustion chamber terminates in a fluid jet nozzle through which gas products of combustion of said propellant and oxidizer are discharged into the atmosphere, and each said spring tension-adjusting means being adapted to be so adjusted as to maintain a constant, preselected ratio between the rates of propellant and oxidizer flows, such that said produtcs of combustion do not cause oxidation reactions with the said chamber and nozzle assembly.

9. A propellant control system according to claim 8, wherein each said spring tension adjusting means is adapted to be so adjusted, as to maintain a constant, preselected ratio between the rates of propellant and oxidizer flows, such that said products of combustion produce maximum specific propelling impulse throughout the complete life of the system.

10. A propellant control system according to claim 8, wherein each said valve and element are so arranged that upon any change in flow area of said nozzle, due to erosion from combustion gases passing therethrough, the fluid flow through each said regulator is correspondingly altered, so as to automatically maintain a constant, preselected propellant/oxidizer mixture ratio that produces maximum specific impulse throughout the complete life of the system.

11. A propellant control system according to claim 10, wherein each said valve and element are arranged to maintain a constant rate of flow therethrough, and consequent constant propellant/oxidizer mixture ratio, notwithstanding relatively large changes in the flow area of said jet nozzle; so that the thrust produced by the discharge of combustion gases from said nozzle is maintained substantially constant, despite said relatively large changes in the flow area of jet nozzle.

References Cited by the Examiner

UNITED STATES PATENTS

| | | | |
|---|---|---|---|
| 991,641 | 5/11 | Plantinga | 137—510 |
| 2,573,471 | 10/51 | Malina | 60—35.6 |
| 2,611,239 | 9/52 | Briggs | 60—39.27 |
| 2,631,426 | 3/53 | Jewett | 60—39.27 |
| 2,714,803 | 9/55 | Abild | 60—39.28 |
| 2,743,577 | 5/56 | Malick | 60—35.6 |

FOREIGN PATENTS 211,974  6/56  Australia.

SAMUEL LEVINE, *Primary Examiner.*

ABRAM BLUM, CARLTON R. CROYLE, *Examiners.*